United States Patent [19]

Esterowitz et al.

[11] Patent Number: 4,967,416
[45] Date of Patent: Oct. 30, 1990

[54] THULIUM-DOPED FLUOROZIRCONATE FIBER LASER PUMPED BY A DIODE LASER SOURCE

[75] Inventors: Leon Esterowitz, Springfield; Roger E. Allen, Alexandria, both of Va.

[73] Assignee: The United States of America as represented by the Secretary of the Navy, Washington, D.C.

[21] Appl. No.: 486,638

[22] Filed: Feb. 28, 1990

[51] Int. Cl.$^5$ .............................................. H01S 3/30
[52] U.S. Cl. ........................................ 372/6; 372/41; 372/75
[58] Field of Search ..................... 372/6, 75, 39, 41

[56] References Cited

U.S. PATENT DOCUMENTS 4,782,491 11/1988 Snitzer ..................................... 372/6
4,847,850 7/1989 Kafka et al. ............................ 372/6

Primary Examiner—Léon Scott, Jr.
Attorney, Agent, or Firm—Thomas E. McDonnell; George Jameson

[57] ABSTRACT

A room temperature laser system for producing a CW laser emission at substantially 2.3 microns is disclosed. In a preferred embodiment, the laser system comprises a laser diode source for producing a CW pump beam at a preselected wavelength; and a fiber laser doped with thulium activator ions sufficient to produce an output CW laser emission at a wavelength in the range of 2.2–2.5 microns when the fiber laser is pumped by the CW pump beam.

33 Claims, 2 Drawing Sheets

THULIUM-DOPED FLUOROZIRCONATE FIBER LASER PUMPED BY A DIODE LASER SOURCE

BACKGROUND OF THE INVENTION

1. Field of the Invention

The present invention relates to lasers and particularly to a diode-pumped, fiber laser doped with thulium activator ions for producing an output CW laser emission at a wavelength of substantially 2.3 microns.

2. Description of the Prior Art

In low power applications, such as in telecommunications and in medical and sensing applications, the use of fiber lasers is becoming more and more important.

In a typical fiber laser a rare earth, such as erbium, neodymium, terbium or praseodymium, is doped into the core of an optical fiber to provide an active gain medium for the fiber laser. Typically, the optical fiber is comprised of silica. The input end of the fiber laser is pumped with optical radiation to produce lasing action in the fiber laser at a wavelength essentially determined by the dopant and the mirror reflectivities. The doped optical fiber is included in the laser resonant cavity of the fiber laser.

A major disadvantage of using a silica fiber as the host optical fiber for the dopant rare earth is that a silica fiber is not suitable for transmitting wavelengths longer than 2 microns. The reason for this is that there is too much attenuation of light in the silica fiber at wavelengths above 2 microns.

Intense research and development have been conducted in the area of fluorozirconate (ZrBaLaNa or ZBLAN) glasses to produce ultra-low-loss fibers for optical communications. Minimum transmission losses in ZBLAN fibers occur over the wavelength range between 2 and 3 microns. It is, therefore, highly desirable to develop ZBLAN rare earth fiber lasers in this wavelength range.

The first demonstration of a 2.3 micron, thulium-doped, ZBLAN fiber laser was demonstrated by Leon Esterowitz and Roger Allen, the inventors in the present application. Pulsed operation was achieved by pumping with a pulsed alexandrite laser. The work was presented at the Lasers '87 Conference in December 1987, at the IEEE/LEO's '88 Annual Conference in November 1988 and at the Conference on Lasers and Electro-Optics in April 1988, and was published in "Electronics Letters", Vol. 24, No. 17, pp. 1104–1106, Aug. 18, 1988. The fiber laser did not operate in the continuous wave mode and was inconveniently pumped by a large alexandrite laser.

OBJECTS OF THE INVENTION

Accordingly, one object of the invention is to provide a thulium-doped fluorozirconate fiber laser pumped by a laser diode source.

Another object of the invention is to provide a laser diode-pumped, CW, 2.3 micron, fiber laser and method for operating same.

Another object of the invention is to provide a room-temperature, laser diode-pumped, thulium-doped, fluoride fiber laser for producing a CW laser emission at substantially 2.3 microns.

Another object of the invention is to continuously pump a thulium-doped fiber laser with a CW pump radiation to enable the fiber laser to produce a CW laser radiation at substantially 2.3 microns.

Another object of the invention is to provide a fiber laser doped with thulium activator ions to produce an output CW laser emission at a wavelength in the range of substantially 2.2 to 2.5 microns when the fiber laser is pumped by a CW pump beam from a laser diode source.

A further object of the invention is to provide a continuous wave laser emission at substantially 2.3 microns in a thulium-doped fluorozirconate fiber laser.

SUMMARY OF THE INVENTION

These and other objects of the invention are achieved by providing a laser system comprising a laser diode source for producing a CW pump beam at a preselected wavelength, and a fiber laser doped with thulium activator ions to produce an output CW laser emission at a wavelength of substantially 2.3 microns when the fiber laser is pumped by the CW pump beam.

BRIEF DESCRIPTION OF THE DRAWINGS

These and other objects, features and advantages of the invention, as well as the invention itself, will become better understood by reference to the following detailed description when considered in connection with the accompanying drawings wherein like reference numerals designate identical or corresponding parts throughout the several views and wherein.

DETAILED DESCRIPTION OF THE PREFERRED EMBODIMENT

Figure 1:
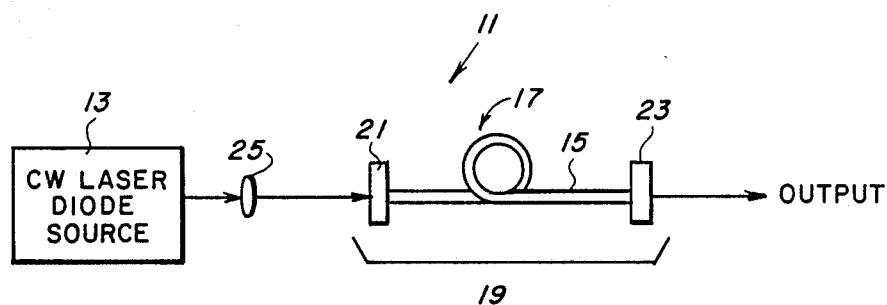
FIG. 1 illustrates a preferred embodiment of the invention.

Referring now to the drawings, FIG. 1 illustrates a thulium-doped, fiber laser 11 pumped by a continuous wave (CW) laser diode source 13 in accordance with the invention. The fiber laser 11 is comprised of a host optical fiber 15 that is doped with thulium activator or lasant ions (not shown) to form a gain medium fiber or laser fiber 17. The laser fiber 17 is disposed in a linear resonant cavity 19 formed by flat mirrors 21 and 23 which are optically aligned with the laser fiber 17. The laser fiber 17 has an exemplary length of 35 centimeters and its ends are respectively butt-coupled to the sides of the mirrors 21 and 23 within the cavity 19.

To take advantage of power confinement in the host optical fiber 15, a quasi-single mode step index fiber 15 is used with an approximate 7.5 micrometer core radius and an index of refraction between the core (not shown) and cladding (not shown) of about 0.005, giving a cutoff wavelength of about 2.4 microns. The core index of refraction is about 1.5. The nominal diameter of the cladding is about 150 microns.

The host optical fiber 15 can be a fluoride fiber, such as a fluorozirconate fiber or a fluorophosphate fiber. As an alternative, the host optical fiber 15 could be a low-loss, water free, silica fiber. For purposes of this description, the host optical fiber 15 is a single-mode fluorozirconate glass fiber. This fiber material is referred to as ZBLAN, which is an acronym derived from the constituent parts of fluorozirconate, namely, $ZrF_4$, $BaF_2$, $LaF_3$, $AlF_3$ and $NaF$.

The host ZBLAN fiber 15 is doped with trivalent thulium activator ions ($Tm^{3+}$) having a mole percentage in the broad range of 0.01% to 0.5%, a mole percentage in the preferred range of 0.04% to 0.25%, or a most preferred mole percentage of 0.1% in the host ZBLAN fiber 15. For a most preferred mole percentage of 0.1% of thulium ions in the fiber 15, the constituent ZBLAN parts of $ZrF_4$, $BaF_2$, $LaF_3$, $AlF_3$ and $NaF$ would have the respective exemplary mole percentages of 53.8%, 20.0%, 4.04%, 3.16% and 18.87%, and the thulium activator ions would be in the compound $TmF_3$ and would substantially have the mole percentage of 0.1% in the host ZBLAN fiber 15.

The laser diode source 13 supplies an exemplary 200 mW, continuous wave (CW), pump beam at an exemplary wavelength of 786 nm to cause the thulium-doped fiber laser 11 to produce a CW laser emission at a wavelength of substantially 2.3 microns. The laser diode source 13 is preferably a GaAlAs laser diode array or a GaAlAs laser diode. Approximately 27 mW of the pump beam is collected and focused by convential optics 25 onto a spot approximately 8 micrometers by 25 micrometers at the surface of the end of the fiber laser 17 in optical contact with the mirror 21.

The input mirror 21 is transparent to the 786 nm wavelength of this exemplary 27 mW of pump power that is incident thereon, but is almost totally reflective to the substantially 2.3 micron, CW laser emission produced by the fiber laser 11 when it is pumped by the pump beam. The output mirror 23 is also highly reflective at 2.3 microns. However, mirror 23 is approximately 0.5% transmissive at the output wavelength of 2.3 microns. Consequently, mirror 23 also operates as an output coupler to output a portion of the substantially 2.3 micron laser emission developed by the fiber laser 11 when it is pumped by the pump power from the CW laser diode source 13.

As a result of the high transmissivity of the input mirror 21 to the 786 nm wavelength of the diode pump power incident thereon, approximately 60% of the exemplary 27 mW of pump power passes through the mirror 21 and is launched into the input end of the laser fiber 17. Approximately 88% of this launched power is absorbed by the thulium dopant at this low pump power. Upon being longitudinally pumped by this absorbed power, the thulium-doped, ZBLAN fiber laser 11 produces a CW laser emission at substantially 2.3 microns. A portion of this 2.3 CW laser emission passes through the partially transmissive mirror 23 (or output coupler) as the output CW laser emission at a wavelength of substantially 2.3 microns.

In an alternative arrangement, the CW laser diode source 13 can be an InGaAlP laser diode source which lases at a wavelength in the range of 680 nm to 690 nm. A pump beam at a wavelength in this range would still pass through the input mirror 21, be launched into the laser fiber 17 and be absorbed by the thulium-doped laser fiber 17, thereby causing the fiber laser 11 to produce an output CW laser emission at substantially 2.3 microns.

Figure 2:
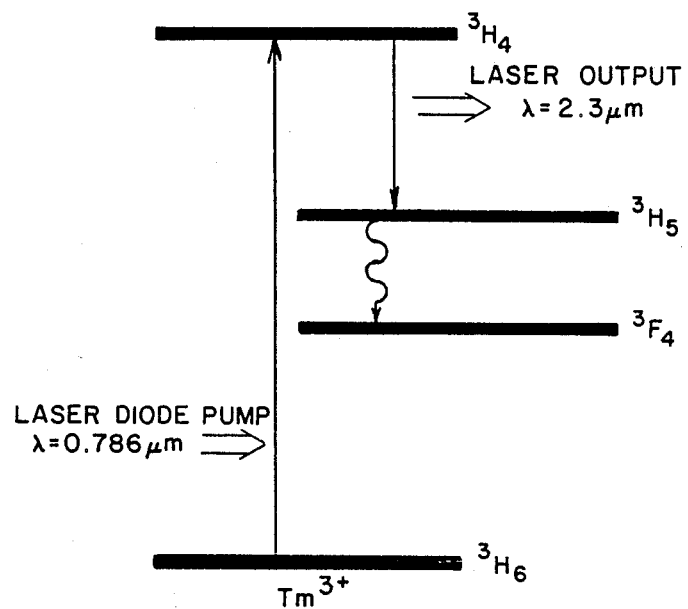
FIG. 2 illustrates an energy level diagram of trivalent thulium, indicating the 2.3 micron lasing transition.

Referring now to FIG. 2, FIG. 2 illustrates an energy level diagram of the trivalent thulium ($Tm^{3+}$) used in the ZBLAN fiber 15, indicating the 2.3 micron lasing transition. As indicated in FIG. 2, in response to the diode pump power at a wavelength of 786 nm (0.786 microns) from the CW laser diode source 13 (FIG. 1), electrons are pumped (or excited) from the $^3H_6$ ground state level all the way up to the $^3H_4$ level. This $^3H_4$ level is the metastable level and is also the upper laser level lifetime. From the $^3H_4$ level the electrons drop down to the $^3H_5$ level, which is the lower laser level. Each electron that drops from the $^3H_4$ level to the $^3H_5$ level causes a photon to be emitted by the fiber laser 11 at a wavelength of substantially 2.3 microns. This 2.3 micron wavelength is the wavelength of the output laser emission from the mirror 23.

The electrons that dropped to the $^3H_5$ level very quickly relax to the $^3F_4$ level, depopulating the $^3H_5$ lower laser level. Since the fiber laser 11 is being continuously pumped by the CW pump power from the CW laser diode source 13, the above-described operation continuously repeats. As a result, a CW laser emission is developed at substantially 2.3 microns between the $^3H_4$ and $^3H_5$ levels.

If the losses in the cavity 19 are too high, then the long lifetime of the $^3F_4$ level would prevent CW operation (although pulsed operation would still be possible) since the pump powers employed would deplete the ground state and populate the $^3F_4$ level. It is desired to keep excess cavity losses at 3% or less to generate CW laser operation. These losses are primarily contributed by the respective optical contacts between the ends of the fiber 17 and the mirrors 21 and 23, scattering and impurity absorption losses.

Figure 3:
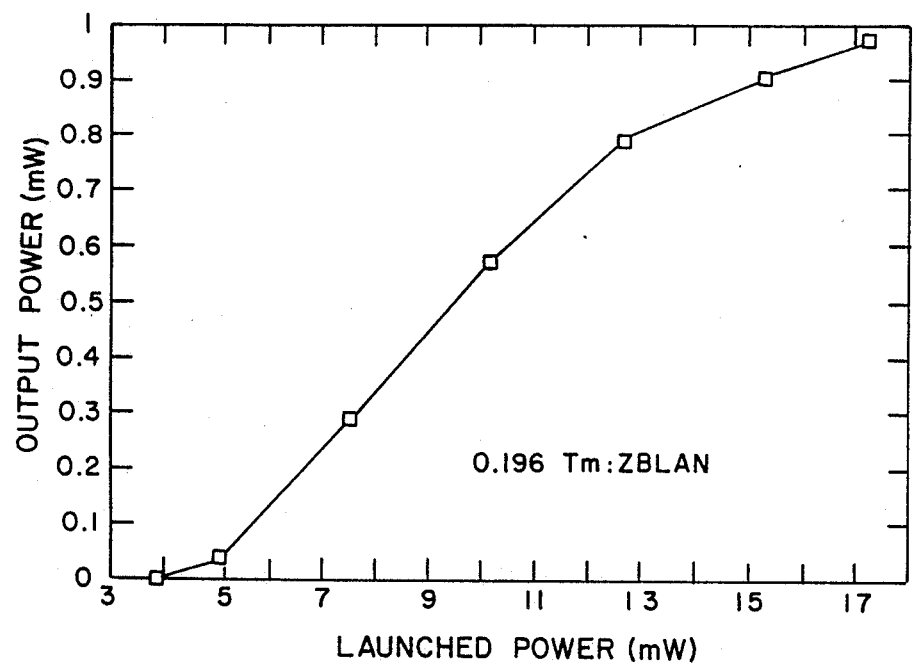
FIG. 3 illustrates the fiber laser output power at 2.3 microns as a function of pump power launched into the fiber 17 and with a 2% output coupling.

FIG. 3 shows laser efficiency data obtained in the system of FIG. 1 for a 2% output coupling. From the near linear portion of the curve corresponding to pump powers less than about 10 mW, a slope efficiency of approximately 10% is estimated. It can be noticed from the curve that the output appears to approach saturation with increasing pump powers. This saturation is most likely caused by the relatively long lifetime of the $^3F_4$ level such that, when pumping above threshold, this level becomes rapidly populated by decay from the $^3H_5$ terminal laser level. For an optically thin medium the population of the $^3F_4$ level above threshold may be given approximately by $$N_{3F4} = N_0 (1 + I_{sat}/I_p)^{-1}. \qquad (1)$$

Here the definition of a saturation flux, $I_{sat}$, is given by $$I_{sat} = h\nu_p A/(\sigma_p \tau), \qquad (2)$$

where $I_p$ is the pump power above threshold, $h\nu_p$ is the pump photon energy, $\sigma_p$ is the pump absorption cross section, N is the total ion concentration, A is the core cross-sectional area of the fiber 17, and $\tau$ is the lifetime of the $^3F_4$ level. From Eq. (2), using values of $h\nu_p = 2.5 \times 10^{-19}$ J, $\tau = 9.8$ ms, and $\sigma = 3.5 \times 10^{-21}$ cm$^2$, a saturation flux, $I_{sat}$, of approximately 15 mW can be calculated. The pump fluences used in FIG. 3 are clearly of the same order as the saturation flux. Therefore, from Eq. (1), a departure from the low-power linear behavior due to depopulation of the ground state level or manifold should be expected.

In order to obtain CW operation, it is necessary to understand the population dynamics of the relevant thulium energy levels. High losses in the laser cavity 19, even under high pump intensity excitation will cause the laser to self terminate (and end CW operation) due to rapid filling of the $^3F_4$ level and depletion of the $^3H_6$ ground state. Introducing an index matching fluid (e.g. a paraffin oil) between the ends of the fiber 17 and the associated mirrors 21 and 23 further decreases the losses to 3% or less in the cavity 19 and significantly aids the successful generation of the 2.3 micron CW laser emission.

It should be noted that CW outputs as high as 1 mW at 2.3 microns have been obtained using a single-mode, thulium-doped ZBLAN fiber laser 11 pumped by a GaAlAs diode source 13. It should also be noted at this time that the system of FIG. 1 can produce an output CW laser emission at a wavelength in the range of 2.2 to 2.5 microns when the fiber laser is pumped by the CW laser diode source 13, because of the different Stark levels (not shown) that are involved in the $Tm^{3+}$ energy level diagram of FIG. 2 and because of the slight differences in the previously-described, alternative fiber materials that could be used as the host optical fiber 15 in FIG. 1. Finally, it is estimated that the system of FIG. 1 will produce a slope efficiency of approximately 10%.

Therefore, what has been described in a preferred embodiment of the invention is a room-temperature, diode-pumped, ZBLAN fiber laser doped with thulium activator ions for producing an output CW laser emission at a wavelength of substantially 2.3 microns.

It should therefore readily be understood that many modifications and variations of the present invention are possible within the purview of the claimed invention. It is therefore to be understood that, within the scope of the appended claims, the invention may be practiced otherwise than as specifically described.

What is claimed and desired to be secured by Letters Patent of the U.S. is:

1. A laser system comprising:
   a fiber laser having a laser fiber doped with a thulium activator ion concentration sufficient to produce an output CW laser emission at a wavelength in the range of 2.4–2.5 microns when said fiber laser is pumped by a CW pump beam, said laser fiber being selected from the group consisting of fluorozirconate fiber, fluorophosphate fiber and low-loss, water-free silica fiber; and
   diode means for emitting a CW pump beam at a wavelength that will be absorbed by the thulium activator ions in the $^3H_4$ or higher energy level of the thulium in said fiber laser.

2. The laser system of claim 1 wherein:
   said laser fiber is selected from the group consisting of fluorozirconate fiber and fluorophosphate fiber.

3. The laser system in claim 1 wherein:
   said laser fiber is comprised of a fluorozirconate fiber which is doped with the thulium activator ions.

4. The laser system of claim 1 wherein:
   said emitting means is comprised of an InGaAlP laser diode source which lases at a wavelength in the range of 680 nm–690 nm.

5. The laser system of claim 1 wherein:
   said emitting means is comprised of a GaAlAs laser diode source which lases at a wavelength in the range of 770–810 nm.

6. The laser system of claim 6 wherein:
   said GaAlAs laser diode source lases at a wavelength of substantially 786 nm.

7. The laser system of claim 1 wherein:
   said emitting means is comprised of a laser diode array.

8. The laser system of claim 8 wherein:
   said laser diode array is a GaAlAs laser diode array for developing said CW pump beam.

9. The laser system of claim 9 wherein:
   said GaAlAs laser diode array lases at a wavelength of substantially 786 nm.

10. The laser system of claim 8 wherein:
    said laser diode array is an InGaAlP laser diode array for developing said CW pump beam.

11. The laser system of claim 1 wherein:
    said thulium activator ions have a mole percentage in the range of 0.01%–0.5% in the fiber laser.

12. The laser system of claim 1 wherein:
    said thulium activator ions have a mole percentage in the range of 0.04%–0.25% in the fiber laser.

13. The laser system of claim 1 wherein:
    said thulium activator ions have a mole percentage of substantially 0.1% in the fiber laser.

14. The laser system of claim 1 wherein:
    said fiber laser is comprised of a fluorophosphate fiber doped with thulium activator ions.

15. The laser system of claim 1 wherein:
    said fiber laser is comprised of a low-loss, water-free, silica fiber doped with thulium activator ions.

16. The laser system of claim 1 wherein:
    said fiber laser is comprised of a single-mode fluorozirconate glass fiber having the constituent parts of $ZrF_4$, $BaF_2$, $LaF_3$, $AlF_3$ and $NaF$; and
    said thulium activator ions are $Tx^{3+}$ ions.

17. The laser system of claim 1 wherein:
    said fiber laser is comprised of a fluorozirconate glass fiber having the constituent parts of $ZrF_4$, $BaF_2$, $LaF_3$, $AlF_3$ and $NaF$ which substantially have the respective mole percentages of 53.8%, 20.0%, 4.04%, 3.16% and 18.87%; and
    said thulium activator ions are in the compound $TmF_3$ which substantially has the mole percentage of 0.1% in the thulium-doped fluorozirconate fiber.

18. The laser system of claim 1 wherein:
    said thulium-doped fiber laser is responsive to said CW pump beam at a wavelength of substantially 786 nm for producing a laser emission corresponding to the $^3H_4$-$^3H_5$ laser transition having the wavelength of substantially 2.3 microns.

19. The laser system of claim 1 wherein said fiber laser includes:
    a first mirror being highly transmissive to said CW pump beam at said preselected wavelength and being highly reflective to said wavelength of said output CW laser emission;
    a second mirror having a low transmissivity at said wavelength of said output CW laser emission; and
    said thulium-doped fiber laser having first and second ends respectively butt-coupled to said first and second mirrors, said thulium-doped fiber laser being responsive to said CW pump beam for producing said output CW laser emission.

20. The laser system of claim 21 further including:
    a resonant cavity formed with said thulium-doped laser fiber in said cavity and said first and second mirrors disposed at opposite ends of said laser fiber to define the limits of said cavity, said resonant cavity having losses of 3% or less.

21. The laser system of claim 1 wherein said laser diode pump means comprises:
    a laser diode array for emitting the CW pump beam at the preselected wavelength; and
    optical means responsive to said CW pump beam for directing said CW pump beam into said fiber laser.

22. The laser system of claim 1 wherein:
    said emitting means comprises a single mode diode laser.

23. The laser system of claim 1 wherein:

said fiber laser produces an output laser emission at substantially 2.3 microns at a slope efficiency of approximately 10%.

24. A method for producing an output CW laser radiation at substantially 2.3 microns, said method comprising the steps of:
producing a CW laser radiation in a fiber laser doped with thulium to lase at a wavelength of substantially 2.3 microns; and
continuously pumping the fiber laser with a CW pump radiation to enable the fiber laser to produce the CW laser radiation at substantially 2.3 microns.

25. The method of claim 24 wherein said producing step includes the steps of:
utilizing a fluorozirconate glass fiber in the fiber laser; and
doping the fluorzirconate glass fiber with an amount of thulium activator ions sufficient to enable the fiber laser to develop a CW radiation at 2.3 microns.

26. The method of claim 25 said continuously pumping step includes the step of:
using a laser diode to continuously pump the thulium-doped fiber laser with a CW pump radiation.

27. The method of claim 25 wherein said continuously pumping step includes the step of:
using a laser diode array to continuously pump the fiber laser with a CW pump radiation.

28. A laser system comprising:
a fiber laser including a gain medium fiber doped with thulium to lase at a wavelength of approximately 2.3 microns, and resonant cavity means for forming a resonant cavity with said gain medium fiber in said resonant cavity, said resonant cavity means including an output coupler for outputting CW laser radiation at approximately 2.3 microns, said gain medium fiber being selected from the group consisting of fluorozirconate fiber, fluorophosphate fiber and low-loss, water-free silica fiber; and
means for continuously providing CW pump radiation into said gain medium fiber.

29. The laser system of claim 28 wherein said resonant cavity means further includes:
first and second mirrors disposed at opposite ends of said gain medium fiber said first mirror having a high transmissivity to said CW pump radiation and a high reflectivity to said CW laser radiation, and said second mirror having a low transmissivity to said CW laser radiation to form said output coupler.

30. The laser of claim 28 wherein:
said means for continuously providing CW pump radiation is a laser diode source.

31. A method for producing a CW laser radiation at substantially 2.3 microns, said method comprising the steps of:
optically pumping $Tm^{3+}$ lasant ions of a gain medium in a fiber laser with the CW pump radiation from a laser diode source;
developing a laser radiation at substantially 2.3 microns from a laser transition of the optically pumped $Tm^{3+}$ lasant ions; and
producing an output CW laser radiation at substantially 2.3 microns.

32. The method of claim 31 wherein the step of optically pumping the $Tm^{3+}$ lasant ions of the gain medium includes the step of:
directing the CW pump radiation from the laser diode source into the gain medium of the fiber laser.

33. A laser system comprising:
a fiber laser having a laser fiber doped with a thulium activator ion concentration sufficient to produce an output CW laser emission at a wavelength in the range of 2.2–2.5 microns when said fiber laser is pumped by a CW pump beam; and
means for emitting a CW pump beam at a wavelength that will be absorbed by the thulium activator ions in the $^3H_4$ or higher energy level of the thulium in said fiber laser.

* * * * *